United States Patent Office 2,719,853
Patented Oct. 4, 1955

2,719,853

PRODUCTION OF DICARBOXYLIC ACID ANHYDRIDES

John C. Reid, Jr., Wynnewood, and George H. Bressler, Springfield, Pa., assignors to The Atlantic Refining Company, Philadelphia, Pa., a corporation of Pennsylvania No Drawing. Application November 26, 1951, Serial No. 258,286

9 Claims. (Cl. 260—346.8)

This invention relates to an improved process for the manufacture of dicarboxylic acid anhydrides. It relates more particularly to an improved process for producing maleic and citraconic anhydrides by reacting a hydrocarbon and air mixture in the presence of a new and novel catalyst. Even more specifically, this invention relates to an improved process for producing increased quantities of citraconic anhydrides by reacting a mixture of hydrocarbons and air in the presence of a new and novel catalyst.

It is well-known that dicarboxylic acid anhydrides can be produced by the catalytic oxidation of various hydrocarbons. Broadly, these known processes comprise reacting a mixture of vaporized hydrocarbons and an oxygen-containing gas in the presence of a heated catalyst. Among the many catalysts which have been proposed for this process are the oxides and salts of vanadium, molybdenum, bismuth, uranium, tungsten, and manganese, as well as the oxides and salts of other metallic elements of the fifth and sixth groups of the periodic system. As a general rule, it has been found that operation with these known catalysts will produce predominately maleic anhydride and only very minute amounts of citraconic anhydride.

Due to the difficulty of producing appreciable yields of citraconic anhydrides by the catalytic oxidation of hydrocarbons, citraconic anhydride has demanded a greater price on the market than has maleic anhydride. Citraconic anhydride can be produced by other involved synthesis processes, but these processes are difficult to control and very uneconomical. Great economies could be effected if citraconic anhydride could be produced in quantity by the direct catalytic oxidation of hydrocarbons in the same manner as maleic anhydride.

It is, therefore, a primary object of this invention to produce high yields of citraconic anhydrides by the catalytic oxidation of hydrocarbons, using a new and novel catalyst.

It has been discovered according to this invention, that this object may be accomplished with vanadium-arsenic-oxygen catalyst compositions. It has been found, quite unexpectedly, that when a hydrocarbon and air are contacted with this novel vanadium-arsenic-oxygen catalyst under controlled conditions of temperature, contact time, and space velocity, it is possible to produce excellent yields of citraconic anhydrides.

The discovery that chemical combinations of vanadium, arsenic and oxygen are excellent oxidation catalysts for the production of high yields of citraconic anhydrides is highly unexpected, since arsenic has heretofore been considered a poison for reactions of this type. Oxides of arsenic alone would, of course, not be operable catalysts since these compounds start to decompose at a temperature below that required for oxidation.

Since this invention primarily resides in the discovery of a novel catalyst composition rather than in any particular process for producing this catalyst, only a few exemplary methods of preparing this catalyst composition are given below. No attempt has been made to recite all of the possible ways in which such a catalyst could be produced as those familiar with the art of catalyst manufacture could, in all probability, readily devise many other equally successful methods for preparing such a catalyst from their knowledge of the preparation of similar or dissimilar catalyst compositions, disclosed in the patent literature or other technical publications.

The preferred method for producing the catalyst involves the addition of a desired quantity of arsenic acid to vanadium oxide. The resulting precipitate is filtered, washed, and dried to produce a greenish-yellow solid. The resulting solid may be ground to any desired size and mixed with the desired amount of a carrier, such as tabular alumina, and then placed in a reactor unit. A specific method of producing a catalyst according to the above method is as follows:

Example I

An arsenic acid solution having a specific gravity slightly greater than 2.0 was prepared by dissolving 189.7 grams of arsenic oxide in approximately 163 cc. of water. A 40 gram portion of this arsenic solution was placed in a separate vessel and brought to a boil. Then 18.1 grams of vanadium oxide were slowly added to the hot arsenic acid solution. An additional 40 gram portion of the arsenic acid solution prepared above was added to the solution until a red solution was obtained. This solution was diluted to about 900 cc. and filtered hot. The filtered solution was allowed to stand overnight whereupon yellow crystals precipitated out which were subsequently filtered, washed with alcohol, and dried on a steam plate.

This resulted in 11.8 grams of a greenish-yellow solid. This solid was then mixed with tabular alumina (204.5 grams).

If an inert carrier such as tabular alumina is to be included in the catalyst composition, it may be added either (1) by physically admixing with the dry vanadium arsenate, or, (2) during the preparation of the vanadium arsenate by conventional single or multiple impregnation procedures. The weight percent of active catalyst in the carrier may be suitably varied between 5% and 100%. For fixed bed operations, it has been found that higher yields are obtained without a carrier, while in fluidized operation a carrier is usually desirable. Among the carriers which may be employed are tabular alumina (alpha alumina), boron phosphate, carborundum, alundum, fuller's earth, pumice, asbestos, or the like. As a general rule, any carrier which exhibits little or no hydrocarbon catalytic activity may be used.

This catalyst may be employed in either a fixed or fluidized reaction zone. A fluidized reaction zone has the advantages of closer temperature control, as well as more intimate contact between the catalyst and reactants. However, in some instances, fluidized operation may be undesirable in that the catalyst particles are subject to considerable attrition which may eventually result in a loss of active material in the form of fines after prolonged periods of use.

This invention will be further explained by reference to the following specific examples which are given for illustrative purposes only and are not intended to limit the procedure to the details given, since the operating conditions may be varied within wide limits without parting from the spirit or scope of the invention.

Example II

A mixture of approximately 74 volumes of air to one volume of hydrocarbon feed was passed over a fixed bed of vanadium arsenate catalyst which was prepared according to the procedure set forth in Example I. The vanadium arsenate was physically admixed with tabular alumina, the tabular alumina comprising 81.8 weight percent of the admixture. The hydrocarbon feed was a cracked naphtha containing about 60% olefins which when analyzed had the following composition:

| | |
|---|---|
| Iso-$C_4$ olefins / Normal $C_4$ olefins | 2.7 |
| Iso-$C_4$ paraffins | 0.14 |
| Normal $C_4$ paraffins | 0.66 |
| Normal $C_5$ olefins | 19.30 |
| Iso-$C_5$ paraffins | 7.70 |
| Normal $C_5$ paraffins | 1.70 |
| $C_6$ paraffins | 13.50 |
| $C_6$ olefins and napthenes | 46.00 |
| Benzene | 0.80 |
| Toluene | 2.80 |
| Hydrocarbons having mol. wt. of approx. 106 | 3.00 |
| Hydrocarbons having mol. wt. of approx. 120 | 1.40 |
| Hydrocarbons having mol. wt. of approx. 134 | .30 |

The space velocity was 0.28 gram of charge stock per hour per gram of vanadium arsenate and the gas velocity was 1.04 feet per second. The temperature was maintained at 900° F. and the contact time was 1.1 seconds.

The yield of dicarboxylic acid anhydrides was 17.2% and 51.6% of this yield consisted of citraconic anhydrides.

The ratio of hydrocarbons to air employed may be varied within wide limits; for example, between 10 and 200 volumes of air per volume of hydrocarbon may be used, however, ranges between 35 to 1 and 100 to 1 are preferred. The choice of the particular ratio to be used is largely dependent upon the particular apparatus, charge stock, and temperature employed, but in all cases the ratio should be sufficiently low on the one hand to utilize reactors within practical size limits and to permit feasible recovery of the desired end product, while on the other hand, the ratio should be sufficiently high to avoid excessive amounts of unreacted hydrocarbons in the product. Oxygen, ozone, or other free oxygen-containing gases may be employed instead of air, with proper choice of oxygen-containing gas volumes to hydrocarbon volumes.

A wide variety of feed stocks may be used with the catalyst of this invention. However, in order to produce maximum yields of citraconic anhydride, it is preferred that olefinic hydrocarbons having more than 4 carbon atoms per molecule be used.

The reaction temperature may be varied between 600° F. and 1100° F., although temperatures of 800° F. to 1000° F. are preferred. The contact time may be between 0.5 and 5.0 seconds, preferably between 0.6 and 2.0. The temperature and contact time are, for the most part, inter-related, a higher temperature usually being employed with a shorter contact time and vice versa. The space velocity may be varied over a relatively wide range, however, 0.04 to 4.0 grams of hydrocarbon per gram of active catalyst per hour is the preferred range. Atmospheric, sub-atmospheric, or super-atmospheric pressures may be employed with equal success. Furthermore, some latitude in selecting the exact catalyst composition (ratio of catalyst to carrier, etc.) is possible, which in turn may necessitate variation or adjustment of the other operating conditions enumerated above in order to utilize the catalyst to its greatest advantage in the production of maximum yields of anhydrides.

The dicarboxylic acid anhydrides can be recovered in a number of ways well-known in the art; for instance, by condensation or absorption in a suitable medium.

Table I below gives some comparative results on the catalytic oxidation of the same cracked naphtha charge stock which was used in Example II, to maleic and citraconic anhydrides with the instant novel catalyst and with vanadium catalysts containing no arsenic. These data show the marked superiority of the instant catalyst in such a process, the yields of citraconic anhydride when using vanadium-arsenic-oxygen catalysts being much greater than when using vanadium oxide alone or vanadium oxide in combination with an element other than arsenic.

As can be seen from this table, in each case the vanadium arsenate not only produces a greater quantitative amount of citraconic anhydride, but also produces a greater percentage of citraconic anhydride than any vanadium catalyst which contains no arsenic.

| | Catalyst | | Percent Tabular Alumina | Charge Stock | Reaction Temp. °F. | Air/H.C. Ratio | Space Velocity | Contact Time (sec.) | Total Anhydrides (wt. percent) | Maleic Anhydride (wt. percent) | Citraconic Anhydride (wt. percent) | Citraconic (wt. percent of total anhydrides) |
|---|---|---|---|---|---|---|---|---|---|---|---|---|
| 8 | 18% Vanadium Arsenate. | | 81.8 | Cracked Naphtha (60% olefins). | 902 | 74/1 | .28 | 1.1 | 17.2 | 8.3 | 8.9 | 51.6 |
| 9 | do | | 81.8 | do | 950 | 74/1 | .28 | 1.1 | 18.2 | 10.3 | 7.9 | 42.8 |
| 10 | do | | 81.8 | do | 1,000 | 74/1 | .28 | 1.1 | 19.4 | 12.3 | 7.1 | 36.6 |
| 11 | 9.1% Vanadium Arsenate. | | 90.9 | do | 900 | 75/1 | .55 | 1.1 | 17.8 | 9.9 | 7.9 | 42.8 |
| 12 | 19% Vanadium Arsenate. | | 81. | do | 950 | 74/1 | .28 | 1.1 | 18.2 | 10.3 | 7.9 | 43.4 |
| 13 | | 9.1 $V_2O_5$ | 90.9 | do | 752 | 74/1 | .54 | 1.3 | 15.0 | 11.5 | 3.5 | 23.4 |
| 14 | | 9.1% 5:4 $V_2O_5$:$MoO_3$. | 90.9 | do | 803 | 75/1 | .54 | 1.2 | 18.9 | 13.3 | 5.6 | 29.6 |
| 5 | | 9.1% 5:4 $V_2O_5$:$MoO_3$. | 90.9 | do | 1,051 | 72/1 | .56 | 1.0 | 22.1 | 21.2 | 0.9 | 4.05 |

It will be understood that the details and examples given hereinbefore are by way of illustration only and not by way of limitation of the invention as broadly described and claimed.

We claim:

1. The method of producing dicarboxylic acid anhydrides which comprises contacting vaporized cracked naphtha containing substantial amounts of unsaturated aliphatic hydrocarbons with a free oxygen containing gas in the presence of a heated catalyst consisting essentially of vanadium arsenate.

2. A method of producing citraconic anhydride which comprises contacting vaporized cracked naphtha containing substantial amounts of unsaturated aliphatic hydrocarbons with a free oxygen containing gas in the presence of a heated catalyst consisting essentially of vanadium arsenate.

3. A method according to claim 2 wherein the free-oxygen containing gas is air.

4. A method according to claim 2 wherein said unsaturated aliphatic hydrocarbons have more than 4 carbon atoms per molecule.

5. A method according to claim 2 wherein the reactants are contacted at a temperature between 600° F. and 1100° F.

6. A method according to claim 2 wherein the reactants are contacted at a space velocity greater than 0.1, a contact time within the range of 0.5 to 5.0 seconds, and a temperature between 800° F. and 1000° F.

7. A method according to claim 2 wherein said catalyst is supported upon a carrier material.

8. A method of producing large yields of citraconic anhydrides which comprises contacting vaporized unsaturated aliphatic hydrocarbons, wherein said hydrocarbons contain substantial amounts of olefinic hydrocarbons having more than 4 carbon atoms per molecule, with a free oxygen containing gas in the presence of a heated catalyst consisting essentially of vanadium, admixed with a carrier.

9. A method according to claim 8 wherein said carrier is tabular alumina.

References Cited in the file of this patent

UNITED STATES PATENTS 1,975,476  Pier et al. _____ Oct. 2, 1934

FOREIGN PATENTS 291,419  Great Britain _____ Jan. 24, 1929

OTHER REFERENCES

Olsen et al.; Ind. and Eng. Chem., vol. 29, pp. 254–67 (1937).

Siegert: Angew. Chem., vol. 50, pp. 319–320 (1937).

Berkmann et al.: "Catalysis" (Reinhold), pp. 469, 478 (1940).

Mellor's Inorganic Chemistry, vol. 9, page 199.